United States Patent [19]

Weidner

[11] 4,419,726
[45] Dec. 6, 1983

[54] INSTRUCTION DECODING IN DATA PROCESSING APPARATUS

[75] Inventor: Albert J. Weidner, Tempe, Ariz.
[73] Assignee: Sperry Corporation, New York, N.Y.
[21] Appl. No.: 225,701
[22] Filed: Jan. 16, 1981
[51] Int. Cl.³ .......................... G06F 9/36; G06F 9/42
[52] U.S. Cl. .................................................. 364/200
[58] Field of Search ... 364/900 MS File, 200 MS File
[56] References Cited

U.S. PATENT DOCUMENTS

| 3,533,076 | 10/1970 | Perkins et al. | 364/200 |
|---|---|---|---|
| 3,636,523 | 1/1972 | De Sandre et al. | 364/200 |
| 4,074,355 | 2/1978 | Tubbs | 364/200 |
| 4,224,668 | 9/1980 | Peters et al. | 364/200 |
| 4,338,661 | 7/1982 | Tredennick et al. | 364/200 |
| 4,338,663 | 7/1982 | Strecker et al. | 364/200 |

Primary Examiner—Jerry Smith
Assistant Examiner—Mark P. Watson
Attorney, Agent, or Firm—G. Donald Weber, Jr.; Eugene T. Battjer

[57] ABSTRACT

An instruction decoding system for data processing apparatus in which alternative instruction interpretations are made possible through hardware sensing of the operational state of one or more machine elements. In one embodiment, a zero detect unit is used to sense the state of a subroutine stack used in a microprogrammed system, therefore permitting a generic "exit" microcommand to be interpreted either as a "return" or a "decode" depending upon the state of the subroutine stack.

12 Claims, 4 Drawing Figures

INSTRUCTION DECODING IN DATA PROCESSING APPARATUS

BACKGROUND OF THE INVENTION

1. Field of the Invention

The invention relates, generally, to the operation of digital computers, and, more particularly, to apparatus and methods comprising a general purpose computer designed to support the process of interpreting machine instructions according to the operational state of one or more machine elements.

2. Description of the Prior Art

A data processing system usually includes a processor unit which executes instructions that are stored in a memory. These instructions are transferred to the processor unit sequentially under the control of a program counter. The processor must interpret each instruction that is passed to it, and direct the machine through a series of operations which correspond to executing the instruction.

According to the prior art, the interpretation of machine language programs is typically performed by a microprogrammed processor. The concept of microprogramming for performing interpretation is well known to those skilled in the digital processing field. However, for purposes of clarity and comparison, a brief explanation of microprogramming will first be presented.

In the early 1950's M. V. Wilkes proposed a computer which would have a variable instruction set. See "The Best Way To Design An Automatic Calculating Machine," Manchester University Inaugural Conference, July, 1951, pp. 16-18. Normally, a fixed set of instructions is available to the programmer, each instruction being made up of a succession of processing steps. The implementation of these steps constitutes the design of most of the machines. However, Wilkes proposed to replace rigid hardwired processing steps with a flexible means by which a programmer could assemble so-called "micro operations" into any instruction. A micro operation is a low-level instruction which, when executed, results in a processing step. Micro operations may be utilized to alter the instruction repertoire of a machine as the applications thereof vary from day to day. This was the origin of the idea of microprogramming.

Microprogramming provides a powerful means of controlling the hardware resources of a machine during each machine cycle. In particular, microprograms allow close control of hardware (register level) data manipulation. However, microprogrammed computers are typically not suitable for general purpose interpretation, i.e., interpretation of arbitrary machine languages or instructions. This is because micro operations are defined in terms of hardware structure and have heretofore been devoid of language structure constructs. Actually, the primary function of microprogrammed processors, i.e., interpretation of machine language instructions, is done indirectly, that is to say with more attention being paid to hardware resources than the language or instruction structure constructs (e.g. grammar).

A number of prior art patents are known which relate to the interaction of language or instruction structure and the hardware or machine elements.

U.S. Pat. No. 3,593,312 describes a processor using a stack which stores an information word which has, as a part thereof, a tag which identifies whether the corresponding information unit contains an extension word. The patent describes means for processing a word stored in a register and means responsive to a tag for automatically processing the extension word thereof.

U.S. Pat. No. 3,938,103 describes a microprogrammed processor which implements a high-level language processor. Hardware comprising the high-level language processor is provided to support the interpretation process. Programming is done in terms of constructs such as character extraction and stack manipulation.

U.S. Pat. No. 3,990,052 describes a microprogrammed processor which provides capabilities for computer instruction skips by direct connection of selected bits of the memory bus, or by testing selected bits of the instruction register.

Prior to the present invention there has not been a single technique of interpreting instructions based upon the operational state of one or more machine elements. More particularly, there has not been a microprogrammed processor for handling microprogram subroutines in a simple and efficient manner.

SUMMARY OF THE INVENTION

Briefly, and in general terms, the invention provides an instruction decoding system for data processing apparatus including alternative instruction interpretations depending upon the operational state of one or more machine elements. In a preferred embodiment the data processing apparatus is a microprogrammed computer and the instruction decoding system functions to decode micro instructions.

An example of an instruction which may include alternative interpretations is a subroutine exit instruction, which has as alternatives either a decode or return interpretation depending upon the state or contents of a hardware register.

DESCRIPTION OF THE PREFERRED EMBODIMENTS

Figure 1:
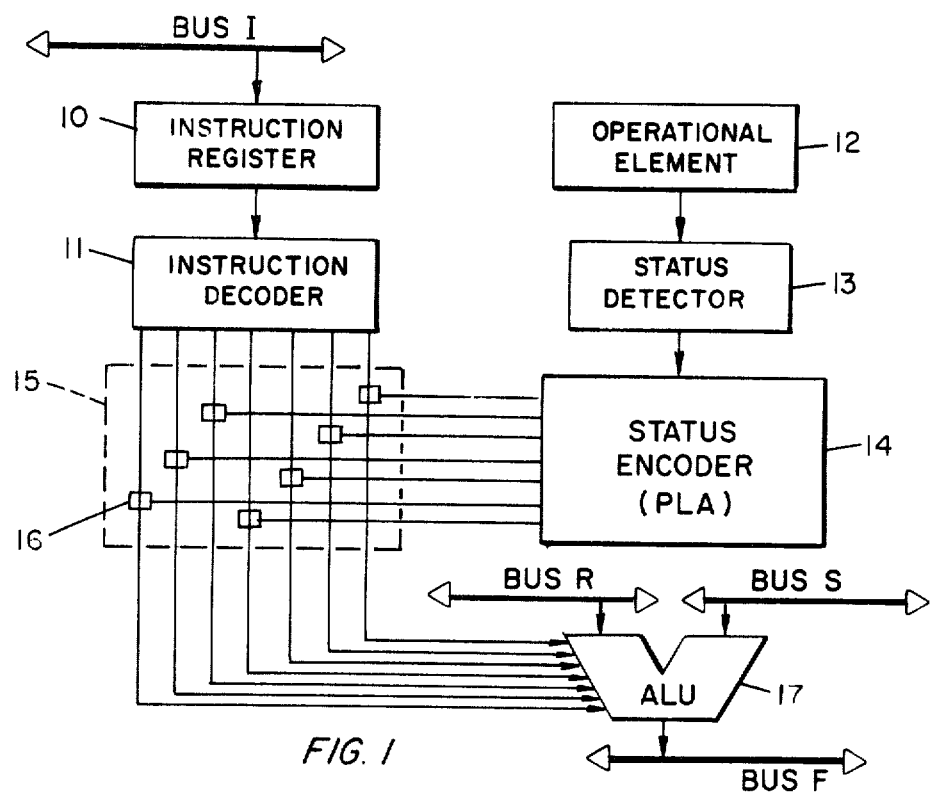
FIG. 1 is a highly simplified block diagram of one implementation of the present invention in a general purpose computer.

Referring now to FIG. 1, there is shown a block diagram of one implementation of the present invention in a general purpose computer. Although the computer architecture illustrated in FIG. 1 is a bus-oriented von Neumann architecture, it is understood that the architecture shown is only one embodiment of the present invention. The same invention can alternatively be implemented in systems without busses, or in systems which are not based upon von Neumann architecture.

In the implementation shown in FIG. 1, instructions are provided via the instruction bus I. Instructions consist of operators and operands. The operators specify the type of operation to be performed by the arithmetic logic unit (ALU), while the operand specifies the data or the location of the data to be operated upon.

The instruction from bus I is stored in the instruction register 10. In the register 10, the operator and operand fields may be isolated and used during execution of the instruction. The actual decoding and interpretation of the instruction is performed by the instruction decoder 11.

Normally the instruction decoder 11 makes the final determination of the action of the instruction based upon the contents of the instruction register 10. However, the present invention provides for alternative instruction interpretations depending upon the status of an operational element 12 of the computer system.

The operational element 12 represents any element of the computer system which takes different values or states during computer operation. The operational element 12 may be under either user or operator control or some other control. For example, the operational element 12 may be a sense switch on the computer console which is manually under user control. The operational element 12 may, alternatively, be an internal component, such as a flip-flop or register which is under program control and not under direct user control. The operational element 12 is used in conjunction with one or more specific machine instructions to control the execution and interpretation of those instructions.

The operational element 12 is connected to a status detector 13 which functions to monitor the status of the operational element 12 and to utilize the results in interpreting the current instruction being processed. The status detector 13 is connected to a status encoder 14 which functions to provide a plurality of outputs to other elements of the computer system.

In the implementation illustrated in FIG. 1, the endoder 14 is connected to a logic circuit 15 which consists of a plurality of gates 16 having one input from the instruction decoder 11 and one input from the status encoder 14. Each of the gates 16 has an output which is connected to the ALU 17. The function of each of the gates 16 is to perform a logical operation upon the two inputs and generate a logical output signal which is applied to the ALU 17. The logical output signal defines or interprets the instruction applied to the ALU 17 based upon both the instruction in the instruction register 10 and the state of the operational element 12.

As an example, each of the gates 16 may be an AND gate having one input connected to receive one bit of the instruction, and another input connected to the output of a programmed logic array (PLA) forming the status encoder 14. The specific instruction applied to the ALU 17 will be determined by the logical operations performed by the gates 16.

The ALU 17 is a standard component in computer design and need not be described in detail. The input to the ALU 17 consists of data supplied along bus R and bus S, while the output is applied to bus F. The instruction applied to the ALU 17 is derived from the logic circuit 15.

Figure 2:
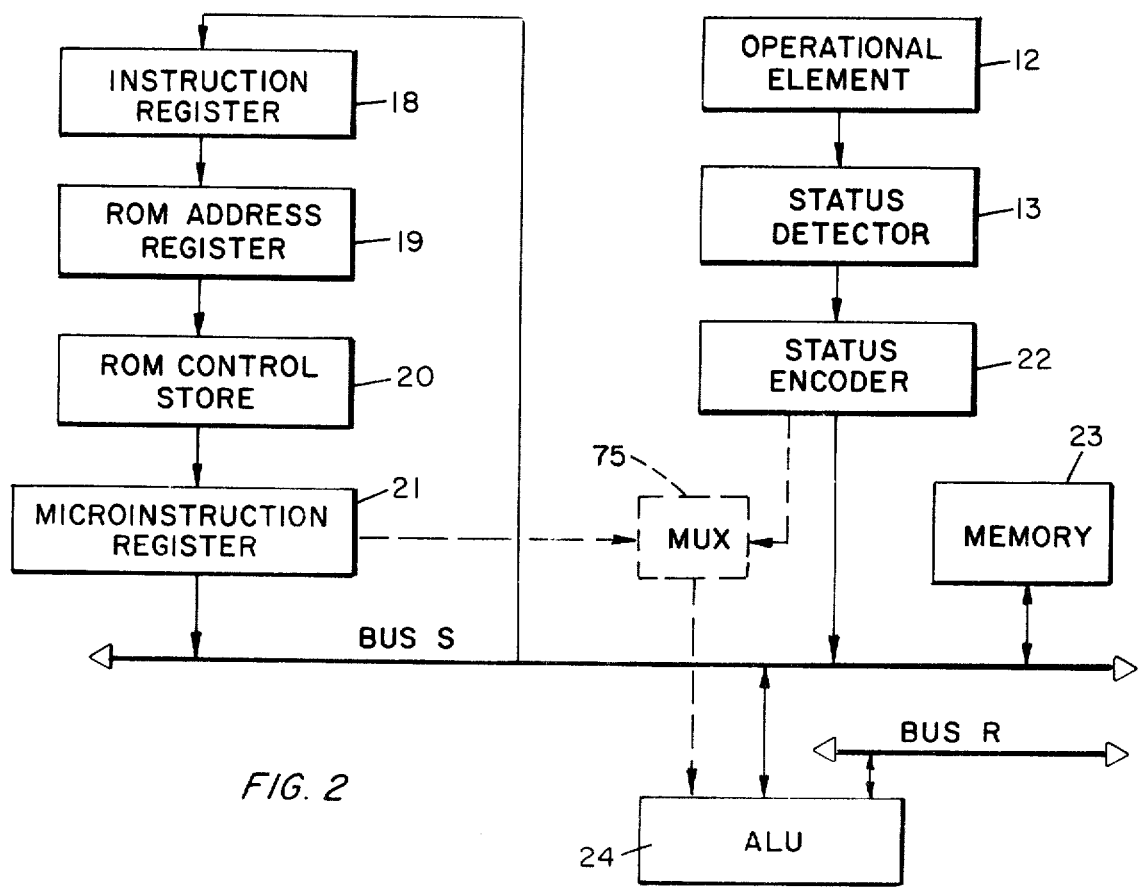
FIG. 2 is a highly simplified block diagram of one implementation of a first embodiment of the present invention in a microprogrammed computer.

Referring now to FIG. 2, there is shown a block diagram of one implementation of the present invention in a microprogrammed computer. The instruction register 18 is concerned with the storing of the machine instruction so that it may be decoded and used by the system. In a microprogrammed system the output of the instruction register 18 is applied to a read-only-memory (ROM) address register 19.

The ROM address register 19 stores the address of the microinstruction which is stored in the ROM control store 20 and which is to be executed in response to the particular instruction in the instruction register 18. The microinstruction is then written from the ROM control store 20 to the microinstruction register 21.

Similar to the implementation shown in FIG. 1, the computer system contains one or more operational elements 12 and corresponding status detectors 13. However, the status encoder 22 which is connected to the status detector 13 is different from the status encoder 14 in FIG. 1.

In FIG. 2, the status encoder 22 is connected directly to the ALU 24 via bus S so that the action of the ALU 24 depends both upon the microinstruction word and the value or values of the status detector 13. An example of the utilization of the status encoder 22 is for the microinstruction word to supply a first portion of the ALU instruction while the status detector supplies a second portion of the ALU instruction, e.g., the microinstruction may supply bits 0-13 and the status encoder supplies bits 14-15.

Another implementation of the connection of the status encoder 22 to the ALU would be through multiplexer 75 (shown dashed) having inputs both from the microinstruction register and the status encoder.

FIG. 2 also shows another input bus, the R bus, to the ALU 24 for supplying other signals thereto.

Figure 3:
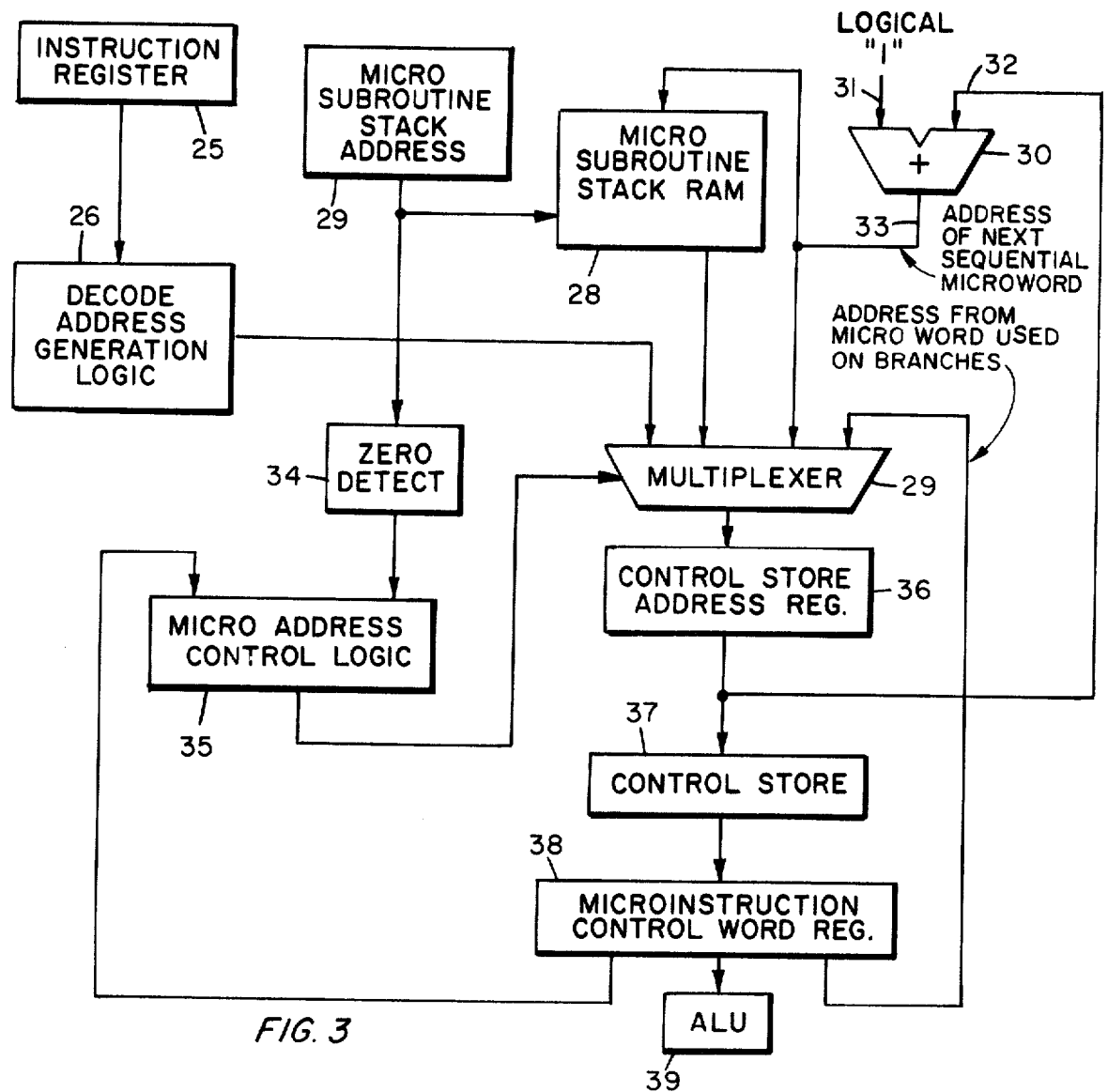
FIG. 3 is a highly simplified block diagram of one implementation of a second embodiment of the present invention in a microprogrammed computer with a subroutine stack.

Referring now to FIG. 3, there is shown one implementation of a second embodiment of the present invention in a microprogrammed computer with a subroutine stack. Although the first embodiment described with reference to FIGS. 1 and 2 is concerned with the general task of monitoring an operational element, the embodiment of FIG. 3 is concerned with a specific operational element, viz. a stack register.

The embodiment of the present invention described with reference to FIG. 3 is concerned with the monitoring of a stack register in a data processing system and the use of the information obtained from such monitoring for controlling subsequent operations of the system. Although the embodiment described makes reference to a microprogrammed system, the principles of the present invention are applicable to data processing systems with other types of architecture.

A stack or stack register is used in a data processing system where it is desired to save a sequence of information items as a group, while maintaining the same sequence in which the items are found. A last-in, first-out stack is utilized for such a purpose, so that information items (e.g., bytes or words) which are written in sequence onto the stack, are subsequently read from the stack in the reverse sequential order, i.e. the "last-in" information item written onto the stack is the "first-out" information item read from the stack.

Stacks are typically utilized in conjunction with subroutine programming, or its equivalent in terms of nested procedures for data processing operations. Subroutine programming usually entails the use of an instruction called a "call subroutine" statement in the main program and a "return" statement in the subroutine program. The call statement is used to initiate the subroutine during processing of the main program and the "return" statement returns the system to the main program when the subroutine is completed. The call statement, therefore, performs two essential functions:

(1) it identifies the subroutine which has been called by name;

(2) it suspends execution of the main program until execution of the subroutine has been completed.

At the completion of this subroutine, the "return" function is performed thereby causing the system to be returned to the state stored in the subroutine stack. Because the use of the stack mechanism allows for nested subroutines, it is clear that the execution of "call" and "return" statements are always paired. That is, the subroutine is always called and the subroutine always provides a return to the main program. Inasmuch as the call and return functions are paired and stored in the stack, a "return" function is never performed with the subroutine stack in the empty condition.

Inasmuch as subroutines can produce either "decode" or "return" microcommands, hardware can be used to recognize the fact that the subroutine return stack is empty. Thus, the "decode" and "return" microcommands can be combined into one generic microcommand called "exit." The "exit" microcommand functions as either a "return" or a "decode" depending upon the state of the subroutine stack when an "exit" command is encountered in the microsequence. A "decode" function is performed when the subroutine stack is empty and a "return" function is performed otherwise.

This allows the identical microsequence used to perform a machine instruction to be "called" by the microsequence used to perform a different machine instruction.

Some of the elements of FIG. 3 are similar to those in FIGS. 1 and 2. For example, the instruction register 25 for the machine instruction is similar to the instruction registers of FIGS. 1 and 2. In the present embodiment, the output of the instruction register 25 is applied to the decode address generation logic unit 26 which, in the present case, may consist simply of read-only memories (ROMs) with some simple logical gates. The output of the decode address generation logic unit 26 is applied to a multiplexer 29.

The multiplexer 29 also receives inputs from the microsubroutine stack RAM 28, from the adder 30, and from the microinstruction control word register 38. The output of the multiplexer 29 is applied to the control store address register 36 which functions to designate the address of the microinstruction which is stored in the control store 37 to be executed.

The control store 37 stores the microinstructions in an addressable array, and provides a microinstruction output to the microinstruction control word register 38.

The output of the control store address register 36 is also transmitted to one of the inputs 32 of an adder 30. The other input 31 of the adder is connected to a logical "1" signal. The output 33 of the adder, namely the value of the address plus one, is applied to the subroutine stack RAM 28, as well as to the adder 30.

The RAM 28 is organized as a last-in, first-out stack for storing specific microcode instruction addresses. The top of the stack is designated by the subroutine stack address input shown in block 27. The RAM 28 is used only when the subroutine is actually being executed. After execution of the subroutine, the RAM 28 is empty and is not used. Under such a design rule, it is possible to sense the subroutine stack address 27 to determine when RAM 28 is empty, which would indicate that a subroutine has completed execution. The means for sensing the state of the RAM 28 in the preferred embodiment is the zero detect device 34.

The zero detect device 34 is a hardware unit, such as a gate, which is responsive to a "zero" logic digit in subroutine stack address 27. If each and every bit in the subroutine stack address 27 is zero, the RAM 28 is considered to be empty.

The output of the zero detect device 34 is connected to an input of the microaddress control logic unit 35. Another input of logic unit 35 is connected to receive an output of the microinstruction control word register 38.

The microinstruction control word register 38 stores the microinstruction control word used by the computer, and includes fields of bits connected to the ALU 39. Other fields of the microinstruction control word are connected to the microaddress control logic unit 35, the multiplexer 29 (to generate the next microinstruction address), and possibly other computer elements.

Figure 4:
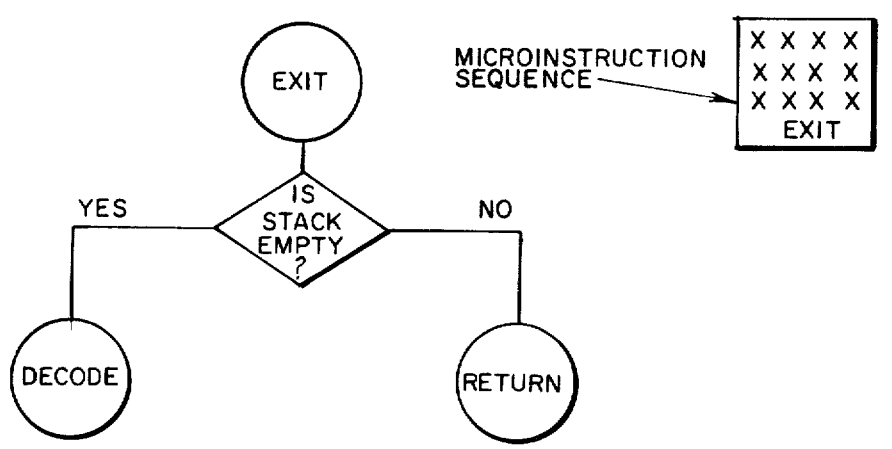
FIG. 4 is a flow chart of the instruction logic in the second embodiment of the present invention.

Referring now to FIG. 4, there is shown a portion of a flow chart representing the execution of an "exit" instruction called using the technique of the present invention. In the present example, the instruction "exit" is interpreted either as a "return" or a "decode" instruction depending upon the state of the subroutine stack.

Although any type of instruction can be used making use of the principles of the present invention, in which the instruction is capable of one or more interpretations depending upon the hardware state of an operative element of the system, a particularly useful embodiment is in subroutine programming in a microprogrammable system.

The objective of the alternative instructions is to permit an identical sequence of microinstructions to perform a machine instruction, or to be called by a call instruction. Such a sequence of microinstructions, as suggested in FIG. 4, is terminated by an "exit" instruction. The exit instruction can then function in two different environments as a "return" when the sequence is a subroutine, and as a "decode" when the sequence is independent. More specifically, when the subroutine stack is empty (i.e. there is no subroutine) it will function as "decode," and when the stack is full (i.e. there is a subroutine), it will function as "return."

Thus, there is shown and described a unique apparatus for decoding of instructions in a data processing system. It is clear that this description is intended to be illustrative only and is not limitative. The scope of the invention is limited only by the scope of the claims appended hereto.

Having thus described a preferred embodiment of the invention, what is claimed is:

1. An instruction decoding system for a data processing apparatus in which alternative instruction interpretations are dependent upon the operational state of at least a part of said apparatus comprising:
  instruction register means (25, 26) for storing an instruction;
  subroutine stack means (27, 28) for generating a generic exit signal which can indicate either a return command or a decode command;
  detection means (34) for detecting the status of said stack means and producing a control signal representative of said status;
  instruction decoding means (29, 30, 36, 37, 38) connected to said instruction register means and to said detection means and functioning to produce instruction execution signals based upon the combination of said instruction and said control signal from said detection means in order to determine whether said exit signal is a return command or a decode command in response to said control signal; and an arithmetic or logical function means (39) having an input connected to said instruction decoding means and responsive to said instruction execution signals to perform a predetermined arithmetic or logical operation.

2. The system recited in claim 1 wherein, said stack means includes stack memory means storing a subroutine including said exit signal and stack address means for storing the addresses of said subroutine, said detection means connected to detect the status of said stack address means in terms of being empty or not.

3. The system recited in claim 1 wherein, said detection means means is a zero detect unit.

4. The system recited in claim 1 including, a microaddress control unit (35) connected to receive a signal from said detection (34) means, and wherein said instruction decoding means includes, a control store device (29, 36, 37) for addressing and storing micro instruction words, said microaddress control unit (35) connected to provide an input to said control store device (29, 36, 37) depending upon the control signal representative of said status.

5. The system recited in claim 4 wherein, said control store device includes a control store unit (37) for storing microinstructions and a control store address register (36) connected to said control store unit (37).

6. The system recited in claim 4 wherein said subroutine stack means includes stack memory means, and multiplexer means connected to receive signals from said stack memory means and from said microaddress control unit, said multiplexer means connected to selectively supply signals received thereby to said control store device.

7. The system recited in claim 6 wherein, said multiplexer means is connected to receive signals from said microaddress control unit to determine the operation of said multiplexer means in passing signals therethrough to said control store device.

8. The data processing system recited in claim 6 wherein, said stack memory means comprises a last-in, first-out (LIFO) stack register.

9. The system recited in claim 8 including, said stack register having a full operational state and an empty operational state, said detection means connected to said stack register and selectively producing stack status signals representing said full state or said empty state of said stack register.

10. The system recited in claim 9 wherein, said stack register includes a stack address register and a subroutine stack memory.

11. The system recited in claim 10 wherein, said stack memory comprises a RAM.

12. The system recited in claim 9 wherein, said stack status signal is supplied to said arithmetic and logical function means.

* * * * *